United States Patent
Smith et al.

(10) Patent No.: US 10,493,509 B2
(45) Date of Patent: Dec. 3, 2019

(54) SPIRAL FORMING

(71) Applicant: Keystone Tower Systems, Inc., Westminster, CO (US)

(72) Inventors: Eric D. Smith, Denver, CO (US); Rosalind K. Takata, Denver, CO (US); Daniel Ainge, Boulder, CO (US); Loren Daniel Bridgers, Golden, CO (US)

(73) Assignee: Keystone Tower Systems, Inc., Westminster, CO (US)

( * ) Notice: Subject to any disclaimer, the term of this patent is extended or adjusted under 35 U.S.C. 154(b) by 0 days.

(21) Appl. No.: 15/191,841

(22) Filed: Jun. 24, 2016

(65) Prior Publication Data

US 2016/0375476 A1    Dec. 29, 2016

Related U.S. Application Data

(60) Provisional application No. 62/185,064, filed on Jun. 26, 2015.

(51) Int. Cl.
  *B21C 37/12*    (2006.01)
  *B21C 37/18*    (2006.01)
  *F03D 13/20*   (2016.01)

(52) U.S. Cl.
  CPC ............ *B21C 37/128* (2013.01); *B21C 37/12* (2013.01); *B21C 37/122* (2013.01); *B21C 37/124* (2013.01); *B21C 37/185* (2013.01); *F03D 13/20* (2016.05); *F05B 2240/912* (2013.01)

(58) Field of Classification Search
  CPC ..... B21C 37/12; B21C 37/122; B21C 37/124; B21C 37/128; B21C 37/185; B21C 37/18; B21B 37/78; B21B 38/10; B21B 39/14
  See application file for complete search history.

(56) References Cited

U.S. PATENT DOCUMENTS

| | | | |
|---|---|---|---|
| 3,146,331 | A | 8/1964 | Willy |
| 3,417,587 | A | 12/1968 | Campbell |
| 3,940,962 | A | 3/1976 | Davis et al. |
| 4,287,739 | A | 9/1981 | Campbell et al. |

(Continued)

FOREIGN PATENT DOCUMENTS

| | | |
|---|---|---|
| CN | 1047991 | 12/1990 |
| CN | 201613273 | 10/2010 |

(Continued)

OTHER PUBLICATIONS

ISA, "PCT Application No. PCT/US16/39214 International Search Report and Written Opinion dated Sep. 8, 2016", 10 pages.

(Continued)

*Primary Examiner* — Debra M Sullivan
(74) *Attorney, Agent, or Firm* — Strategic Patents, P.C.

(57) ABSTRACT

Spiral forming methods can be used to join edges of a rolled material along a spiral joint to form conical and/or cylindrical structures. Alignment of the edges of the rolled material can be controlled in a wrapping direction as the material is being joined along the spiral joint to form the structure. By controlling alignment of the edges of the material as the edges of the material are being joined, small corrections can be made over the course of forming the structure facilitating control over geometric tolerances of the resulting spiral formed structure.

18 Claims, 10 Drawing Sheets

(56) References Cited

U.S. PATENT DOCUMENTS

| | | | |
|---|---|---|---|
| 4,640,453 A | 2/1987 | Oe et al. | |
| 6,339,945 B2 | 1/2002 | Miller et al. | |
| 2001/0018839 A1 | 9/2001 | Miller et al. | |
| 2015/0273550 A1* | 10/2015 | Takata | B21C 37/122 72/12.5 |
| 2019/0160505 A1 | 5/2019 | Smith et al. | |

FOREIGN PATENT DOCUMENTS

| | | |
|---|---|---|
| JP | 2005315722 | 11/2005 |
| WO | WO-2015148756 | 10/2015 |
| WO | WO-2016210248 | 12/2016 |

OTHER PUBLICATIONS

SIPO, "CN Application No. 201680049489.9 First Office Action dated Nov. 20, 2018", English and Chinese Translations, 27 pages.

SIPO, "CN Application No. 201680049489.9 Search Report dated Nov. 8, 2018", 3 pages.

EPO, "EP Application Serial No. 16815364.1, Supplemental Search Report dated Jan. 17, 2019", 8 pages.

NIPA, "CN Application No. 201680049489.9 Second Office Action dated Jul. 16, 2019", English and Chinese Translations , 20 pages.

* cited by examiner

SPIRAL FORMING

CROSS-REFERENCE TO RELATED APPLICATIONS

This application claims the benefit of priority of U.S. Provisional Patent Application No. 62/185,064, filed on Jun. 26, 2015, the entire contents of which are incorporated herein by reference.

GOVERNMENT LICENSE RIGHTS

This invention was made with government support under NSF Phase II SBIR grant NSF IIP-1353507, awarded by the National Science Foundation. The United States government has certain rights in this invention.

BACKGROUND

In a spiral forming manufacturing process, a sheet of steel is fed into a mill and continuously roll-formed into a desired shape. For example, using this technique a cylinder or a conical shape can be formed by feeding sheets of suitably shaped material into the mill and continuously joining the curved, roll-formed material along a spiral edge as the material exits the mill. While a variety of useful structures such as steel towers for wind turbines can be fabricated using this technique, the process remains susceptible to large-scale deformation or failure in fabricated structures due to small, accumulating errors in alignment and feed rates.

There remains a need for improved techniques for spiral forming, and in particular, improved techniques that enable the detection and correction of misalignments along the joined edge(s) of a spiral formed material.

SUMMARY

Spiral forming methods can be used to join edges of a rolled material along a spiral joint to form conical and/or cylindrical structures. Alignment of the edges of the rolled material can be controlled in a wrapping direction as the material is being joined along the spiral joint to form the structure. By controlling alignment of the edges of the material as the edges of the material are being joined, small corrections can be made over the course of forming the structure facilitating control over geometric tolerances of the resulting spiral formed structure.

In one aspect, a spiral forming method includes monitoring a first edge region of a rolled material, monitoring a second edge region of the rolled material, detecting a deviation from a target relationship between the first edge region and the second edge region, adjusting a shape of the first edge region and a shape of the second edge region relative to one another to reduce the deviation, and, with the first edge region and the second edge region adjusted relative to one another, joining the first edge region to the second edge region along the spiral joint. The second edge region can be adjacent to the first edge region along a spiral formed in the material such that the first edge region to the second edge region are joined along the spiral joint.

In some implementations, monitoring the first edge region and monitoring the second edge region each includes monitoring the respective edge region at a position upstream of joining the first edge region to the second edge region along the spiral joint.

In some implementations, monitoring the first edge region and monitoring the second edge region each includes monitoring the respective edge region at a first position along the respective edge region and adjusting the respective edge region at a second position along the respective edge region to reduce the deviation. The first position can be spatially separated from the second position. For example, the first position for monitoring the first edge region and monitoring the second edge region can be downstream of joining the first edge region to the second edge region along the spiral joint.

In certain implementations, detecting the deviation includes detecting whether the first edge region matches the second edge region to within a predetermined tolerance. If the first edge region and the second edge region do not match one another to within the predetermined tolerance, adjusting the shape of the first edge region and the second edge region relative to one another can include introducing an out-of-plane gap between the first edge region and the second edge region. For example, introducing the out-of-plane gap between the first edge region and the second edge region can include wrapping the first edge region at a first diameter and wrapping the second edge region at a second diameter different from the first diameter. As an additional or alternative example, introducing the out-of-plane gap between the first edge region and the second edge region can include maintaining a maximum out-of-plane gap until the deviation from the target relationship between the first edge region and the second edge region is no longer detected. As another additional or alternative example, introducing the out-of-plane gap between the first edge region and the second edge region can include maintaining the out-of-plane gap for not more than a complete circumference of the rolled material. As yet another additional or alternative example, introducing the out-of-plane gap between the first edge region and the second edge region can include sizing the out-of-plane gap to match a predetermined portion of the first edge region to a predetermined portion of the second edge region.

In some implementations, adjusting the first edge region and the second edge region relative to one another includes matching discrete portions of the first edge region to respective discrete portions of the second edge region. For example, matching the discrete portions of the first edge region to the respective discrete portions of the second edge region can include matching visual indicia on the first edge region to respective visual indicia of the second edge region. Additionally, or alternatively, the respective discrete portions of the first edge region and the second edge region can be spaced at regular, discrete intervals along the first edge region and the second edge region. As an example, the spacing of the regular, discrete intervals along the first edge region can be the same as the spacing of the regular, discrete intervals along the second edge region.

In certain implementations, detecting the deviation from the target relationship between the first edge region and the second edge region includes receiving a manual input corresponding to the detected deviation.

In some implementations, at least one of monitoring the first edge region and monitoring the second edge region includes receiving, from a surface roller in contact with the rolled material, a rolled distance signal corresponding to the respective first edge region or second edge region. In addition, or in the alternative, at least one of monitoring the first edge region and monitoring the second edge region can include receiving, from a magnetic sensor in proximity with the rolled material, a magnetic signal corresponding to the respective first edge region or second edge region. Additionally, or alternatively, at least one of monitoring the first edge region and monitoring the second edge region includes receiving, from an optical sensor directed at the rolled material, an optical signal indicative of the respective first edge region or second edge region.

In certain implementations, the spiral extends circumferentially about an axis of the rolled material and has an axial dimension along the axis defined by the rolled material. For example, a radial distance from the axis to the spiral is substantially constant along the axial dimension of the rolled material such that the rolled material is substantially cylindrical. As an additional or alternative example, a radial distance from the axis to the spiral can be monotonically varying along the axial dimension of the rolled material such that the rolled material is substantially conical.

In some implementations, the first edge region is along a first rolled sheet and the second edge region is along a second rolled sheet.

In another aspect, a method includes monitoring discrete portions along a first edge region of a rolled material, monitoring discrete portions along a second edge region of the rolled material opposite the first edge region along a spiral, determining whether one or more of the discrete portions along the first edge region is aligned, within a predetermined tolerance, with a corresponding one or more of the discrete portions along the second edge region along the spiral, and modifying the rolled material to align the respective discrete portions along the first edge region and the second edge region. The rolled material can, for example, include a plurality of sheets of material joined end to end.

In certain implementations, the respective discrete portions along the first edge region and the second edge region include visual indicia. At least one of monitoring the discrete portions along the first edge region and monitoring the discrete portions along the second edge region can, for example, include receiving a signal indicative of the position of the visual indicia on the first edge region relative to the position of the visual indicia on the second edge region.

In some implementations, the respective discrete portions along the first edge region and the second edge region are at regularly spaced intervals along the first edge region and the second edge region.

In yet another aspect, a method includes positioning a first edge region of a rolled material adjacent to a second edge region of the rolled material such that the second edge region is opposite the first edge region along a spiral, and introducing an out-of-plane misalignment to the first edge region relative to an abutting edge of the second edge region along the spiral to control alignment, in a rolling direction, of the first edge region to the second edge region along the abutting edge.

In certain implementations, introducing the out-of-plane misalignment of the first edge region relative to the second edge region along the spiral is based on a targeted change between a first path length corresponding to the first edge region and a second path length corresponding to the second edge region.

In some implementations, introducing the out-of-plane misalignment of the first edge region relative to the second edge region along the spiral includes modifying an overall circumference of the rolled material.

In certain implementations, introducing the out-of-plane misalignment of the first edge region relative to the second edge region along the spiral includes introducing the out-of-plane misalignment along only a portion of a circumference of the rolled material.

In some implementations, an amount of the out-of-plane misalignment is maintained below a predetermined threshold.

Implementations can include one or more of the following advantages.

In some implementations, the shape of the first edge region and the shape of the second edge region are adjusted relative to one another to reduce the deviation from a target relationship between the edge regions of the rolled material. Such adjustments can facilitate, for example, making small corrections to misalignments of the first edge region and the second edge region. Accordingly, as compared to spiral forming methods that do not include such adjustments, spiral forming methods including such adjustments can facilitate increased control over geometric tolerances of the resulting spiral formed structure.

In certain implementations, adjusting the shape of the first edge region and the shape of the second edge region relative to one another to reduce the deviation includes introducing an out-of-plane gap between the first edge region and the second edge region as the material is being rolled. Accordingly, the control of the out-of-plane gap can be used to make small corrections to any detected misalignment with little to no adverse impact on the throughput of the spiral forming process.

In some implementations, the first edge region and the second edge region each include respective visual indicia such that detecting deviation from a target relationship of the first edge region and the second edge region can be based on detecting misalignment of the visual indicia. The visual indicia on the first edge region and the second edge region do not require structural modification of the first edge region or the second edge region and, therefore, do not interfere with the structural quality of the spiral formed structure. Further, misalignment of the visual indicia can be readily detected by an observer and/or optical sensors, thus providing a robust mechanism for detecting misalignment.

Other aspects, features, and advantages will be apparent from the description and drawings, and from the claims.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially" or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

Spiral forming processes of the present disclosure are described with respect to forming segments of wind towers. However, this is by way of example and should not be understood to limit the presently disclosed processes in any way. The spiral forming processes of the present disclosure can be used to a variety of useful structures such as, for example, wind towers, pilings, other structural pieces for civil engineers (e.g., columns), pipelines, spiral ducting, and the like.

Figure 1:
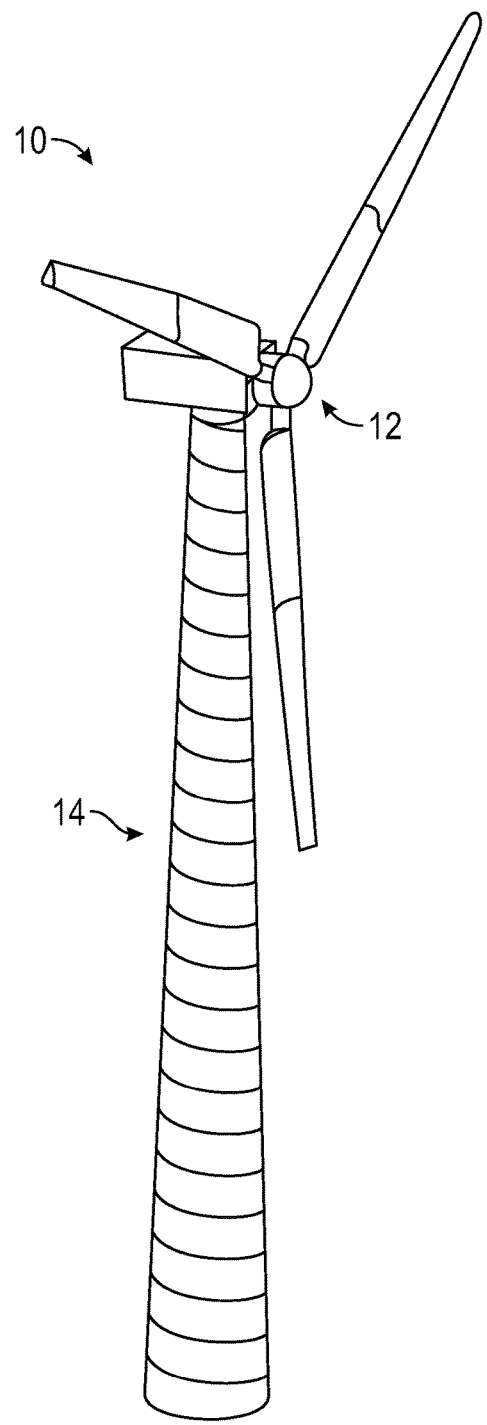
FIG. 1 is a schematic of a wind turbine assembly including a tapered tower.

Referring to FIG. 1, a wind turbine assembly 10 includes a wind turbine 12 supported by a tower 14. The tower 14 has a diameter that decreases along the length of the tower 14 so that the top where the wind turbine 12 is attached has a smaller diameter than the bottom or base. The axially tapering diameter of the tower 14 can be useful, for example, for providing a combination of efficient use of material and structural strength to support the loads exerted by or on the wind turbine 12 in the field. The tower 14 may be fabricated from segments formed using a continuous spiral forming process in which, as described in greater detail below, the rolling of the sheet of material is controlled to align the edges of the sheet material as the sheet of material is rolled into shape and joined along a spiral joint to form a conical shape. When fabricated in this manner, the structural performance of the tower 14 may be further impacted by the alignment of material (e.g., steel) that is wrapped and joined together to form the axially tapering diameter of the tower 14. As described herein, control over the alignment of the edges of the sheet material during a continuous spiral forming process facilitates the ability to make small corrections, thus reducing alignment errors and improving the strength and geometric accuracy of the tower 14.

Figure 2:
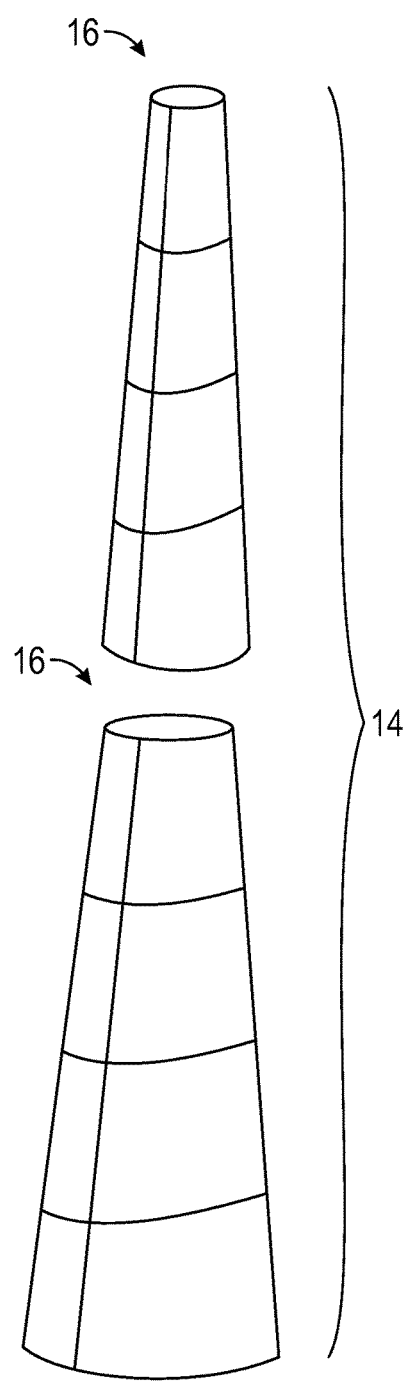
FIG. 2 is a perspective, exploded view of the tapered tower of FIG. 1 including conical segments.

Referring now to FIG. 2, the tower 14 may include a plurality of conical segments 16 joined (e.g., welded) to one another. For example, the conical segments 16 can be fabricated at a mill, according to the methods described herein, and then shipped to the field, where the conical segments 16 can be welded or otherwise mechanically coupled to one another to form the tower 14. While this provides a useful, modular structure, the tower 14 may instead be formed of a unitary conical segment without departing from the scope of the present disclosure.

Each conical segment 16 can have either an actual peak or a virtual peak. For example, one of the conical segments 16 can be shaped as a cone and, therefore, have an actual peak at its apex. Additionally, or alternatively, one or more of the conical segments 16 can be shaped as a truncated structure, such as a frusto-conical structure, and, therefore, have a "virtual peak" at the point at which the taper would eventually decrease to zero if the structure were not truncated. Unless otherwise specified, the methods described herein are applicable to conical segments 16 having either an actual peak or a virtual peak.

Figure 3:
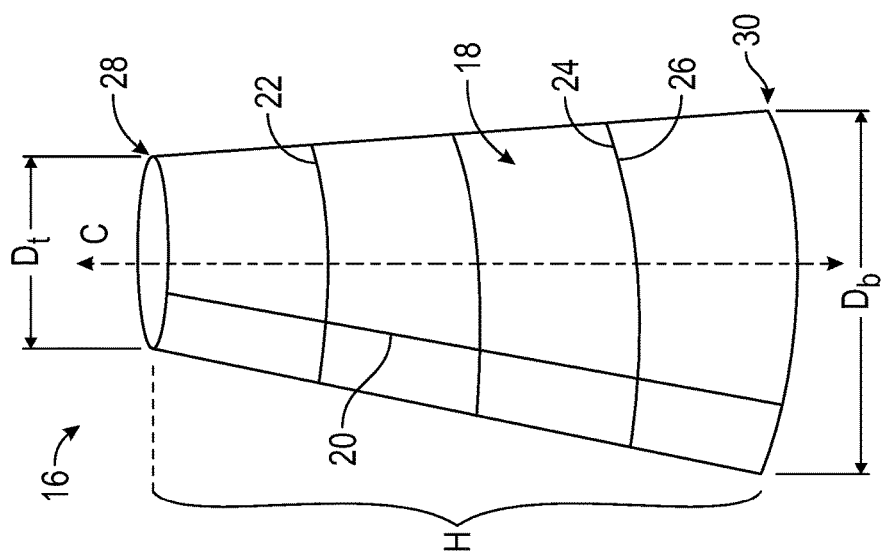
FIG. 3 is a perspective view of one of the conical segments of the tapered tower of FIG. 1.

Referring now to FIG. 3, each conical segment 16 may include a plurality of sheets 18 joined (e.g., welded) to one another along cross joints 20 and along a spiral joint 22. As described in further detail below, the sheets 18 may be joined end-to-end along the cross joints 20 prior to rolling the sheets 18 into the conical segment 16. As also described in further detail below, a first edge region 24 of the end-to-end arranged sheets 18 may be joined (e.g., welded) to a second edge region 26 of the end-to-end arranged sheets 18 along a spiral joint 22.

Geometrically, the conical segment 16 may define a longitudinal axis "C" and have a height "H," a top diameter $D_t$ along a truncated apex portion 28, and a bottom diameter $D_b$ along a base 30. In certain implementations, the conical segment 16 is a right circular cone, and the longitudinal axis "C" is a central axis. In such implementations, the tower 14

(FIG. 2) is constructed by aligning the longitudinal axis "C" of each of the conical segments 16 and joining the truncated apex portion 28 of a first one of the conical segments 16 to the base 30 of another one of the conical segments 16. Thus, it should be appreciated that, in such implementations, the top diameter $D_t$ of the truncated apex portion 28 of first one of the conical segments 16 is substantially equal (e.g., to within manufacturing tolerances) to the bottom diameter $D_b$ of the base 26.

Each sheet 18 in the conical segment 16 may be trapezoidal and joined to each of the other sheets 18 such that the cross joints 20 extend along non-parallel sides of the respective trapezoid of joined sheets 18. Where each sheet 18 is trapezoidal, wrapping the end-to-end joined sheets 18 results in a first edge region 24 and a second edge region 26 extending along parallel sides of the respective trapezoid of joined sheets 18 in the shape of a spiral. For suitably shaped and sized trapezoids, joining the first edge region 24 to the second edge region 26 along the spiral produces the spiral joint 22 and the overall conical shape of the conical segment 16. Accordingly, as described in greater detail below, the accuracy with which the first edge region 24 and the second edge region 26 are joined to one another to form the spiral joint 22 can be a critical factor in meeting any geometric tolerance and/or structural quality requirements for a tower.

Each sheet 18 can be, for example, steel or any other material suitable for spiral forming. Each sheet 18 can be substantially the same thickness (e.g., greater than about 5 mm and less than about 40 mm in thickness for wind tower applications, while other thickness ranges are additionally or alternatively possible for other applications). In certain implementations, however, the sheets 18 can have varying material thickness along the height "H" of the conical segment 16. Such varying material thickness can, for example, facilitate efficient use of material, with more material used in portions of the tower 14 (FIG. 2) that experience larger loads and less material used in portions of the tower 14 that experience smaller loads.

The spiral joint 22 may extend in a spiral which, as used herein, includes a joint that wraps around the circumference of a structure while also extending along the length of the structure. For example, the term spiral is inclusive of any curvilinear shape extending multiple times around the circumference of a structure while also extending along the length of the structure. Accordingly, the use of the term spiral, as used herein, should be understood to include a curve on a conical or cylindrical surface.

The spiral joint 22 may extend circumferentially about the longitudinal axis "C" such that the radial distance from the spiral joint 22 to the longitudinal axis "C" is monotonically varying in a direction along the longitudinal axis "C" such that the rolled sheets 18 form a structure that narrows as it approaches one end. This may be, for example, a linear taper that forms a substantially conical shape of the conical segment 16. Thus, the rate of monotonic variation of the radial distance between the spiral joint 22 and the longitudinal axis "C" may be a function of the height "H", the top diameter $D_t$, and the bottom diameter $D_b$ of the conical segment 16. In addition, or in the alternative, the spiral joint 22 can extend circumferentially about the longitudinal axis "C" of the conical segment 16, and may vary as the position along the axis changes.

Figure 4:
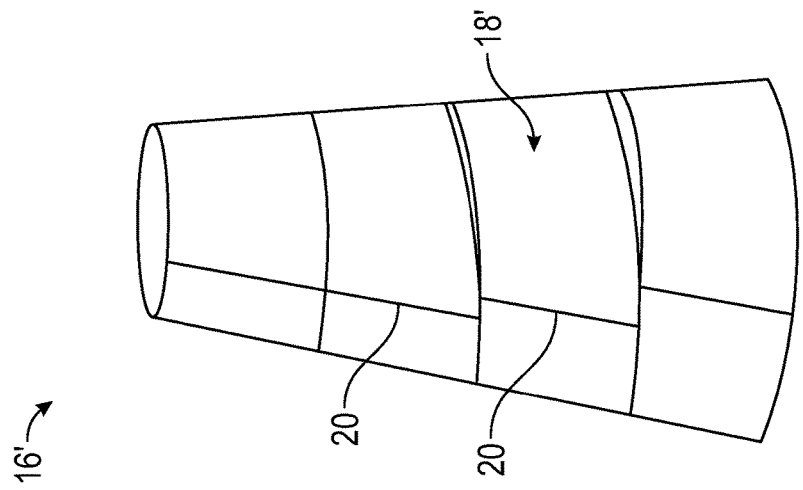
FIG. 4 is a perspective view of a conical segment with misaligned edges.

Referring now to FIGS. 3 and 4, the sheets 18 forming the conical segment 16 may be aligned with one another such that there are not significant gaps and/or overlap between the sheets 18, and they coupled together to form the intended structure. By comparison, the sheets 18' forming the conical segment 16' may not aligned with one another, resulting in significant gaps between and/or overlap of the sheets 18'. As compared to the conical segment 16' with more significant gaps and/or overlap of the sheets 18', the properly aligned and fitted seams of the conical segment 16 will typically have improved structural quality and/or will have an increased likelihood of falling within intended geometric specifications for a particular application. For at least these reasons, it is desirable to control the alignment of the sheets 18 to reduce the likelihood of significant gaps and/or overlap, and the methods and systems contemplated herein can advantageously support improved alignment by dynamically monitoring and correcting deviations as they arise during spiral forming.

In spiral forming processes, gaps and/or overlap of the sheets of material, such as those shown with respect to sheets 18' of conical segment 16', can generally occur if one wrap of the material is advanced or receded compared to a previous wrap of the material. Accordingly, the methods disclosed herein include detecting deviations from a target relationship between the first edge region 24 and the second edge region 26, and then taking corrective action based on the detected deviations. For example, this may include adjusting the respective shapes of the first edge region 24 and the second edge region 26 relative to one another to adjust the relative feed rates and reduce and/or eliminate the deviation as the spiral forming process progresses to join the sheets 18 to one another to form the conical segment 16. It will be appreciated that the adjacent edges will typically be driven by a common feed roll or other mechanism, so it may be difficult to physically drive the adjacent edges at different rates. However, the relative geometry or path of the adjacent edges may be manipulated to obtain a difference in path length traveled by the adjacent edges, thus effectively adjusting the relative feed rate so that the two edges can be re-aligned as desired (within practical limits) during fabrication.

Figure 5:
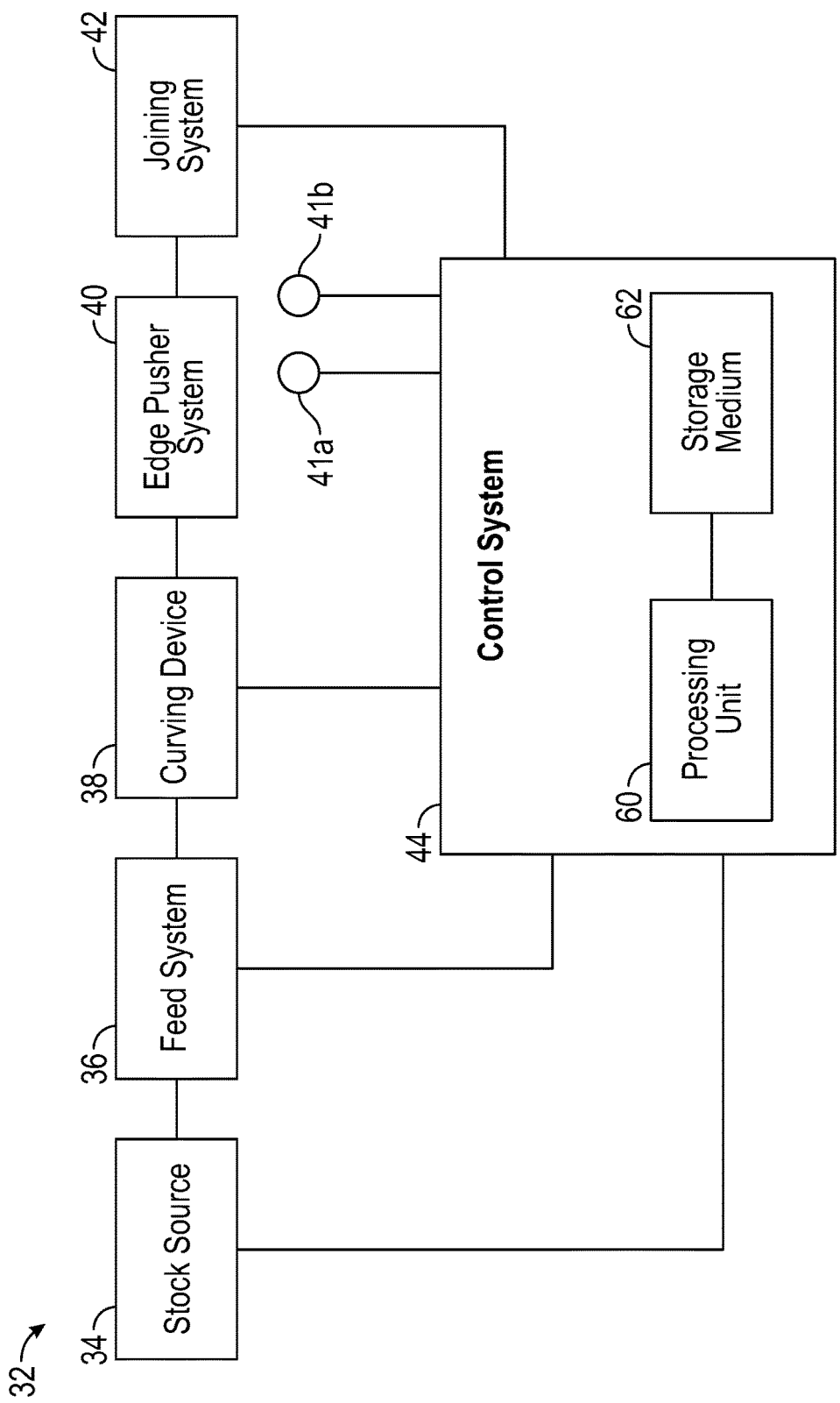
FIG. 5 is a block diagram of a fabrication system.
Figure 6:
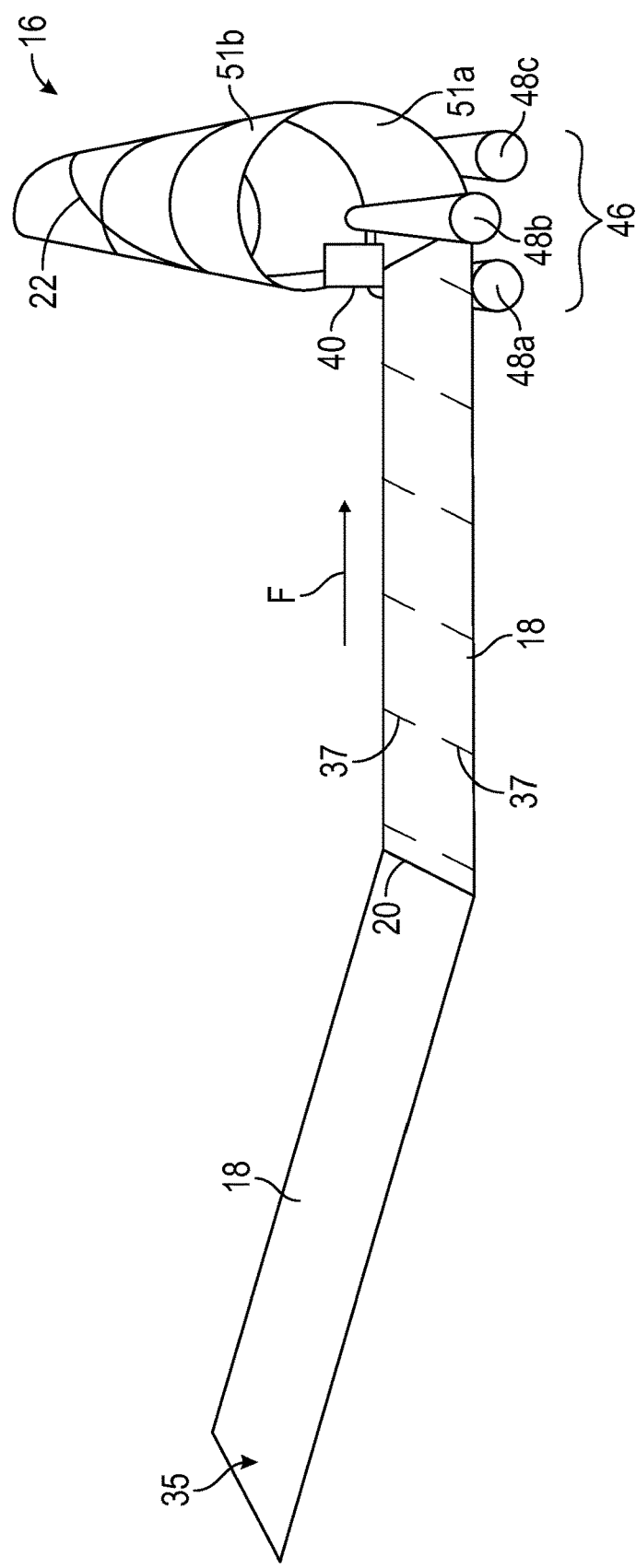
FIG. 6 is a schematic representation of a spiral forming process carried out by the fabrication system of FIG. 5.
Figure 7:
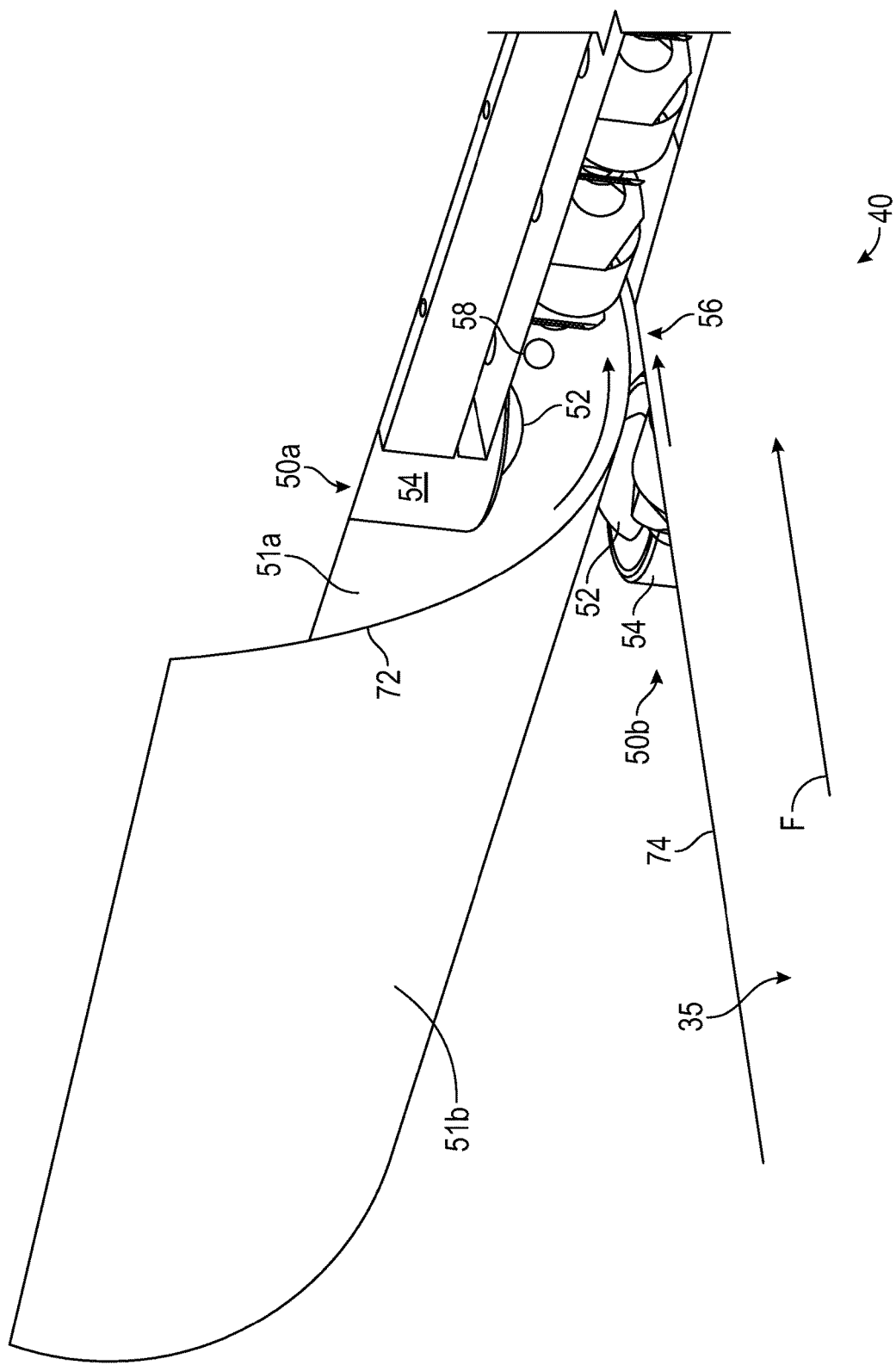
FIG. 7 is a schematic representation of an edge pusher system of the fabrication system of FIG. 5.

Referring now to FIGS. 5-7, a fabrication system 32 may include a stock source 34, a feed system 36, a curving device 38, an edge pusher system 40, a first sensor 41a, a second sensor 41b, a joining system 42, and a control system 44. As described in greater detail below, the fabrication system 32 may be operable to fabricate the conical segments 16 (FIG. 3) according to the spiral forming methods disclosed herein. The control system 44 may receive signals from the first sensor 41a and the second sensor 41b and the control system 44 may control at least one of the stock source 34, the feed system 36, the curving device 38, the joining system 42, and the edge pusher system 40. In some implementations, the control system 44 may control more or fewer components of the fabrication system 32, and any combinations thereof. For example, the control system 44 may additionally control a runout system to move formed portions of the conical segment 16 in a direction away from the curving device 38 and/or the joining system 42. For clarity of explanation, the operation of the fabrication system 32 and the methods of spiral forming disclosed herein are described with respect to the conical segments 16 described above. It should be appreciated, however, that other spiral formed structures (e.g., substantially cylindrical structures) may also or instead be fabricated using these techniques.

The control system 44 may include a processing unit 60 and a storage medium 62 in communication with the processing unit 60. The processing unit 60 can include one or more processors, and the storage medium 62 can be a non-transitory, computer-readable storage medium. The storage medium 62 may store computer-executable instructions that, when executed by the processing unit 60, cause the system 32 to perform one or more of the spiral forming methods described herein. Optionally, the control system 44 can include an input device (e.g., a keyboard, a mouse, and/or a graphical user interface) in communication with the processing unit 60 and the storage medium 62 such that the processing unit 60 is additionally, or alternatively, responsive to input received through the input device as the processing unit 60 executes one or more of the spiral forming methods described herein.

More generally, the control system 44 may include any processing circuitry configured to receive sensor signals and responsively control operation of the fabrication system 32. This may, for example, include dedicated circuitry configured to execute processing logic as desired or required, or this may include a microcontroller, a proportional-integral-derivative controller, or any other programmable process controller. This may also or instead include a general purpose microprocessor, memory, and related processing circuitry configured by computer executable code to perform the various control steps and operations contemplated herein.

The stock source 34 may include sheets 18 of source material, which can be stored in a magazine or other suitable dispenser to facilitate selection and loading of the sheets 18 during manufacturing. The sheets 18 may be joined (e.g., welded) to one another at cross joints 20 to form a continuous strip 35 of the stock material. Where the sheets 18 are trapezoidal, the cross joints 20 may be oblique to a feed direction "F" at which the continuous strip 35 enters the curving device 38. It should be appreciated, however, that the cross joints 20 can be perpendicular to the feed direction "F" in implementations in which the sheets 18 are rectangular, such as implementations in which the structure formed by the fabrication system 32 is substantially cylindrical.

The sheets 18 may include visual indicia 37, which can be added to the sheets 18 before or after formation of the continuous strip 35. The visual indicia 37 can be, for example, spaced at regular intervals (e.g., at each meter) along the continuous strip 35, or at any other constant or varying interval(s) useful for detecting variations that can be corrected as contemplated herein. The visual indicia 37 can be, for example, tick marks or other similar markings observable by an optical sensor, a machine vision system, and/or manufacturing personnel. Further, the visual indicia 37 can be permanently applied to the sheets 18, e.g., through etching or other permanent marking technique, and/or the visual indicia may be temporarily applied to the sheets 18 using chalk, paint, stickers, or the like. While it is specifically contemplated that the visual indicia 37 can be used for automated detection of misalignment, it should be appreciated that the visual indicia 37 may also provide a convenient, visual, human-readable indicator of successful alignment when fabrication of a structure has been completed. Further, it should be appreciated that that detecting misalignment is described using the visual indicia 37 by way of example and, as described in greater detail below, other forms of indicia (e.g., changes in material properties) may be used in addition or as an alternative to the visual indicia 37 without departing from the scope of the present disclosure.

Figure 8B:
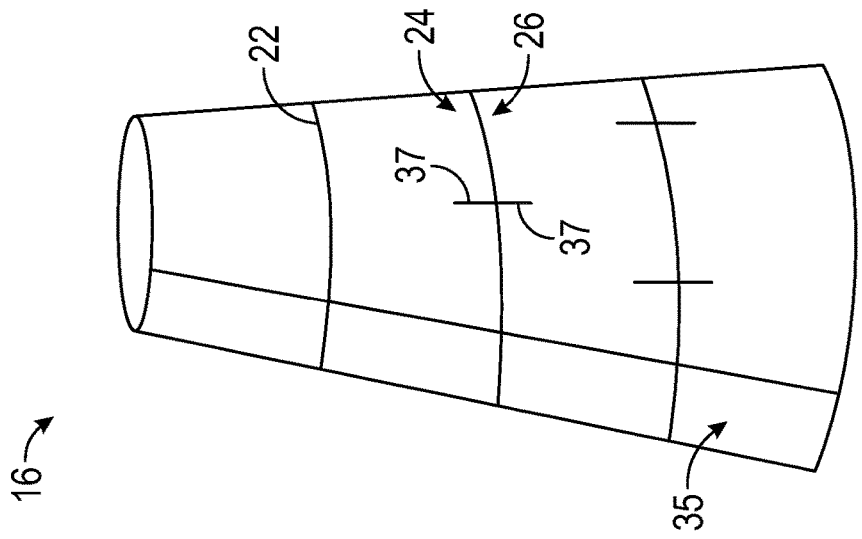
FIG. 8B is a schematic view of a section of a conical segment in which visual indicia along a first edge region are aligned with visual indicia along a second edge region.
Figure 8A:
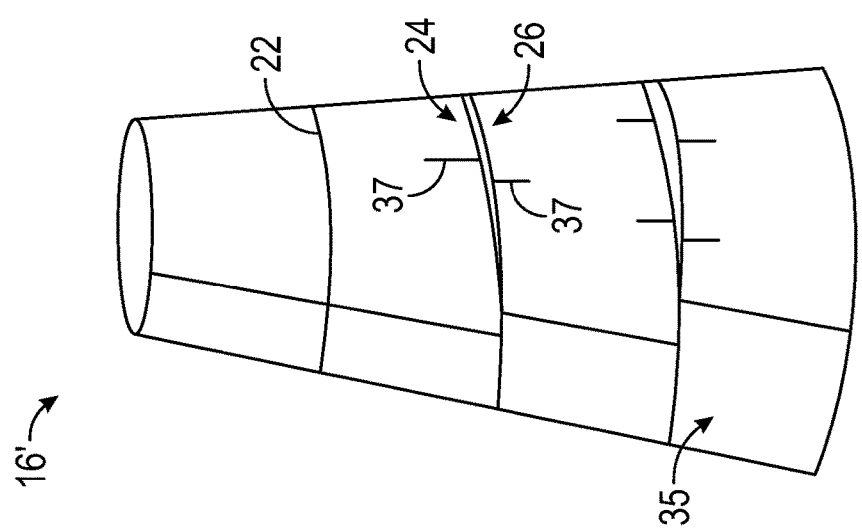
FIG. 8A is a schematic view of a section of a conical segment in which visual indicia along a first edge region are misaligned with visual indicia along a second edge region.

Referring to FIG. 8A, when the first edge region 24 and the second edge region 26 of the continuous strip 35 are misaligned along the spiral joint 22, such misalignment is detectable and/or observable as a corresponding misalignment of the visual indicia 37 on the first edge region 24 with respect to the visual indicia 37 on the second edge region 26. Thus, FIG. 8A depicts a case in which misalignment between the first edge region 24 and the second edge region 26 has been allowed to continue, and the corrective processes of the present disclosure have not been applied.

Referring to FIG. 8B, when the wrap of the first edge region 24 and the second edge region 26 of the continuous strip 35 is ideally aligned along the spiral joint 22, this alignment is also detectable and/or observable as corresponding alignment of the visual indicia 37 on the first edge region 24 relative to the second edge region 26. Accordingly, as described in greater detail below, controlling the degree of alignment and/or misalignment of the visual indicia 37 of the first edge region 24 relative to the visual indicia 37 of the second edge region 26, as the spiral joint 22 is being formed, can decrease errors in alignment of the first edge region 24 relative to the second edge region 26 along the spiral joint 22.

The distance between visual indicia 37 can be increased or decreased, depending on the amount of control desired over the alignment of the first edge region 24 relative to the second edge region 26 and, thus, the amount of control desired over the strength quality and/or geometric tolerance required for a specific application. That is, implementations in which the visual indicia 37 are spaced at smaller distances from one another may offer an increased sensitivity to geometric variations, as compared to implementations in which the visual indicia 37 are spaced at greater distances from one another. At the same time, placing visual indicia 37 too close together along an edge may result in measurement ambiguity where very large displacements are occurring. In the latter case, where both high sensitivity and large-scale measurements are desired, each marking may be uniquely encoded so that relative displacement can be referenced to a specific visual indicator on the abutting edge. Thus, as will be appreciated by one of ordinary skill in the art that the spacing and labeling of the visual indicia 37 may take a variety of forms according to the range of expected deviations and the desired measurement accuracy.

Referring again to FIGS. 5-7, the feed system 36 may be operable to transport the continuous strip 35 of stock material from the stock source 34 to and/or through the curving device 38. The feed system 36 may include any equipment suitable for moving the continuous strip 35 according to traditional techniques. Such equipment can include, for example, robotic arms, pistons, servo motors, screws, actuators, rollers, drivers, electromagnets, or combinations thereof.

The curving device 38 may impart a controllable degree of curvature to the continuous strip 35 of material fed into it, preferably without imparting in-plane deformation to the metal. The curving device 38 may, for example, include a bank 46 including rollers 48a, 48b, 48c positioned relative to one another and to the continuous strip 35 to impart curvature to the continuous strip 35 of material fed through the rollers 48a, 48b, 48c. Each roller 48a, 48b, 48c can include, for example, a plurality of individual rollers independently rotatable relative to one another and arranged along a respective axis defined by the respective roller 48a, 48b, 48c.

The joining system 42 may mechanically couple the first edge region 24 and the second edge region 26 of the curved continuous strip 35 to one another along the spiral joint 22. The joining system 42 can include, for example, a welder that welds the first edge region 24 and the second edge region 26 to one another along the spiral joint 22 using any suitable welding technique. A variety of techniques for welding are known in the art and may be adapted for joining an edge as contemplated herein. This may, for example, include any welding technique that melts the base metal or other material along the spiral joint 22, optionally along with a filler material that is added to the joint to improve the strength of the bond. Conventional welding techniques suitable for structurally joining metal include, by way of example and not limitation: gas metal arc welding (GMAW), including metal inert gas (MIG) and/or metal active gas (MAG); submerged arc welding (SAW); laser welding; and gas tungsten arc welding (also known as tungsten, inert gas or "TIG" welding); and many others. These and any other techniques suitable for forming a structural bond between the first edge region 24 and the second edge region 26 may be adapted for use in a joining system 42 as contemplated herein. The mechanical coupling imparted by the joining system 42 can be, for example, continuous along the spiral joint 22 to provide enhanced structural strength of the conical segment 16. The mechanical coupling may also or instead include intermittent coupling (e.g., at fixed distances) along the spiral joint 22 to facilitate, for example, faster throughput for applications in which structural strength of the conical segment 16 is not a key design consideration.

The first sensor 41a may be directed toward the first edge region 24 and the second sensor 41b may be directed toward the second edge region 26. The first sensor 41a and the second sensor 41b can be, for example, optical sensors in communication with the control system 44 and, in certain implementations, the first sensor 41a and the second sensor 41b may be the same sensor, e.g., where a camera captures an image of a region where the abutting edges come into contact (or near contact) prior to structural joining. Additionally, or alternatively, the first sensor 41a and the second sensor 41b can be one or more cameras in communication with a machine vision system of the control system 44. The first sensor 41a and the second sensor 41b may more generally include any sensor or combination of sensors suitable for detecting visual indicia 37 such as any of those described above that have been placed along the edges of sheets of material, and more specifically for detecting relative displacement of the visual indicia 37 along the adjacent edges. In another aspect, in addition to or in the alternative to the visual indicia 37, the first sensor 41a and the second sensor 41b can sense changes to one or more material properties (e.g., a magnetic property) such that the one or more material properties can be monitored along each of the adjacent edges during fabrication. In yet another aspect, visual indicia 37 may be omitted and rollers or other sensors may be used to continuously and independently measure linear travel along each of the adjacent edges during fabrication. However measured, any detected differences in linear travel may be used as a feedback signal, or to generate a feedback signal, useful for controlling a process as contemplated herein.

The first sensor 41a and the second sensor 41b may be oriented relative to the continuous strip 35 to monitor the respective first edge region 24 and the second edge region 26 at a position upstream of the joining system 42. For example, the first sensor 41a and the second sensor 41b may each detect the visual indicia 37 along the respective first edge region 24 and the second edge region 26 such that, by comparing the time at which the visual indicia 37 were detected on the respective first edge region 24 and the second edge region 26 as the continuous strip 35 moves at a known speed in the feed direction "F", the control system 44 can detect whether the first edge region 24 and the second edge region 26 are within an acceptable deviation (e.g., within a predetermined geometric tolerance) from a target relationship (e.g., exact alignment or alignment to within a predetermined tolerance) between the two adjacent edge regions 24, 26. If the alignment of the visual indicia 37 of the first edge region 24 with the visual indicia 37 of the second edge region 26 deviates beyond the target relationship, the control system 44 can execute corrective action through, for example, control of the edge pusher system 40 that is positioned upstream of the joining system 42.

As shown in FIG. 7, the edge pusher system 40 may include a first pusher 50a and a second pusher 50b. The first pusher 50a may be disposed along an inner surface 51a of the continuous strip 35 of material, at or near a position in the fabrication system 32 where the continuous strip 35 of material has been curved into the conical segment 16, but not yet joined to an adjacent edge. The second pusher 50b may be disposed in a complementary position along an outer surface 51b of the continuous strip 35 of material, also at or near a position in the fabrication system 32 where the continuous strip 35 of material has been curved to form the conical segment 16 but not yet joined. The first pusher 50a and the second pusher 50b may cooperate to controllably apply normal forces to the plane of a sheet of material to adjust an out of plane alignment of a first edge 72 relative to a second edge 74 along the spiral joint. For example, the first pusher 50a and the second pusher 50b may exert normal forces on the curved sheet at or near a location where the first edge 72 of the curved sheet converges with a second edge 74, which is also curved, as the two edges 72, 74 come together for welding or other joining. While the edge pusher system 40 is described herein as including the first pusher 50a and the second pusher 50b, the edge pusher system 40 can include fewer or a greater number of pushers, or any other configuration or mechanisms suitable for controlling a planar alignment of two sheets of material along a converging edge in a manner that permits control of an out-of-plane offset between the two sheets. Additionally, or alternatively, any other configuration or combination of configurations suitable for exerting forces on the continuous strip 35 of material to move the first edge region 24 and the second edge region 26 relative to one another are within the scope of the present disclosure.

The first pusher 50a and the second pusher 50b can each include a roller 52 and an actuator 54 mechanically coupled to the roller 52. The roller 52 of the first pusher 50a may be in rolling contact with the inner surface 51a of the continuous strip 35 of material, and the roller 52 of the second pusher 50b may be in rolling contact with the outer surface 51b of the continuous strip 35 of material. More specifically, each roller 52 may be controllably moved by an actuator 54 so that, where planar alignment of the edges 72, 74 is to be adjusted, it moves the material in a desired direction. In general, each actuator 54 may be actuatable to move a respective one of the rollers 52 in a direction perpendicular to the respective edge 72, 74 that is not being moved such that movement of each actuator 54 moves the edges 72, 74 relative to one another.

Further, one or more of the actuators 54 may be in electrical communication with the control system 44 such that the control system 44 can control the position of one or more of the actuators 54 to control the offset imparted by the rollers 52 on the continuous strip 35 of material. For example, the first pusher 50a can push down on the inner surface 51a of the continuous strip 35 while the control system 44 controls the position of the actuator 54 of the second pusher 52b relative to the outer surface 51b of the continuous strip. More specifically, the first pusher 50a can create a counterforce to maintain the continuous strip 35 in contact with the roller 52 of the second pusher 50b while the second pusher 50a is movable in a direction perpendicular to the continuous strip 35 to set the position for the continuous strip 35. Thus, it should be appreciated that this exemplary cooperation between the first pusher 51a and the second pusher 51b can facilitate moving the edges 72, 74 relative to one another as part of any one or more of the corrective actions described herein to control an out-of-plane gap 56 between the first edge region 24 and the second edge region 26

The actuators 54 can for example include a motor and screw, a screwjack, or other similar mechanisms. In implementations in which the first pusher 52a pushes down on the inner surface 51a, the actuator 54 can, in addition or in the alternative, include any one or more actuation mechanisms suitable for generating this downward force on the continuous strip 35, including, by way of non-limiting example, a mechanical spring, pneumatic piston, pneumatic spring, and combinations thereof. By way of further non-limiting example, it should be appreciated that the weight of the continuous strip 35 and any section of spiral formed material attached to the continuous strip 35 can, in certain instances, generate downward forces for maintaining contact between the continuous strip 35 and the roller 52 of the second pusher 50b. In such instances, if the weight is sufficient to maintain contact between the continuous strip 35 and the roller 52 of the second pusher 52b, a single pusher (e.g., pusher 52b) may be used to move the edges 72, 74 relative to one another while the force of gravity maintains the continuous strip 35 in contact with the roller 52 of the second pusher.

While each pusher 50a, 50b has been described as having a single roller 52, other configurations are additionally or alternatively possible. For example, one or both of the pushers 50a, 50b can include a pair of rollers on a rocker. This can, for example, facilitate distributing the pushing force and reduce the likelihood of local damage to the sheet in applications that require higher push forces.

The edge pusher system 40 may include a gap sensor 58 in communication with the control system 44 and directed toward the first edge region 24 and the second edge region 26 to measure the out-of-plane gap 56, and/or to provide a signal indicative of the individual or relative positions of the edge regions 24, 26. The gap sensor 58 can include an optical sensor, a machine vision sensor, a contact sensor or any sensor or combination of sensors using, e.g., optical, mechanical, acoustic, electromagnetic, or other forces to detect a relative alignment between the edge regions 24, 26.

The control system 44 may receive, from the first sensor 41a and from the second sensor 41b, respective signals indicative of the position of the visual indicia 37 within the first edge region 24 and the position of visual indicia 37 within the second edge region 26. Based on the signals received from the first sensor 41a and from the second sensor 41b, the control system 44 can detect whether the visual indicia 37 along the monitored portion of the first edge region 24 and the visual indicia 37 along the monitored portion of the second edge region 26 deviate from a target relationship with one another. In certain implementations, the control system 44 also receives a signal from the gap sensor 58. Based on the detected deviation of the first edge region 24 and the second edge region from a target relationship with one another and, optionally, the signal received from the gap sensor 58, the control system 44 can adjust the out-of-plane gap 56 between the first edge region 24 and the second edge portion 26. For example, the control system 44 can control the wrap diameter of the first edge region 24 relative to the wrap diameter of the second edge region 26 through controlling the first pusher 50a and/or the second pusher 50b of the edge pusher system 40.

Figure 9A:
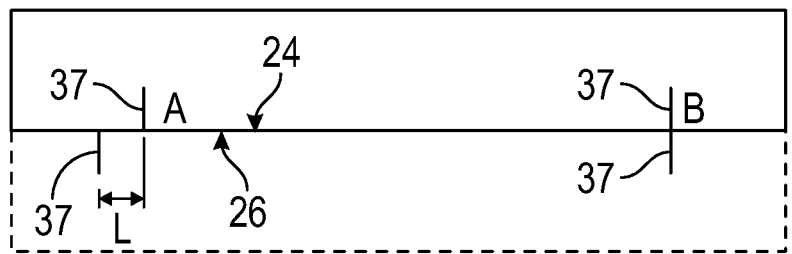
FIG. 9A is a top view of a corrective action for aligning a first edge portion and a second edge portion of a conical segment through the control of an out-of-plane gap.
Figure 9B:
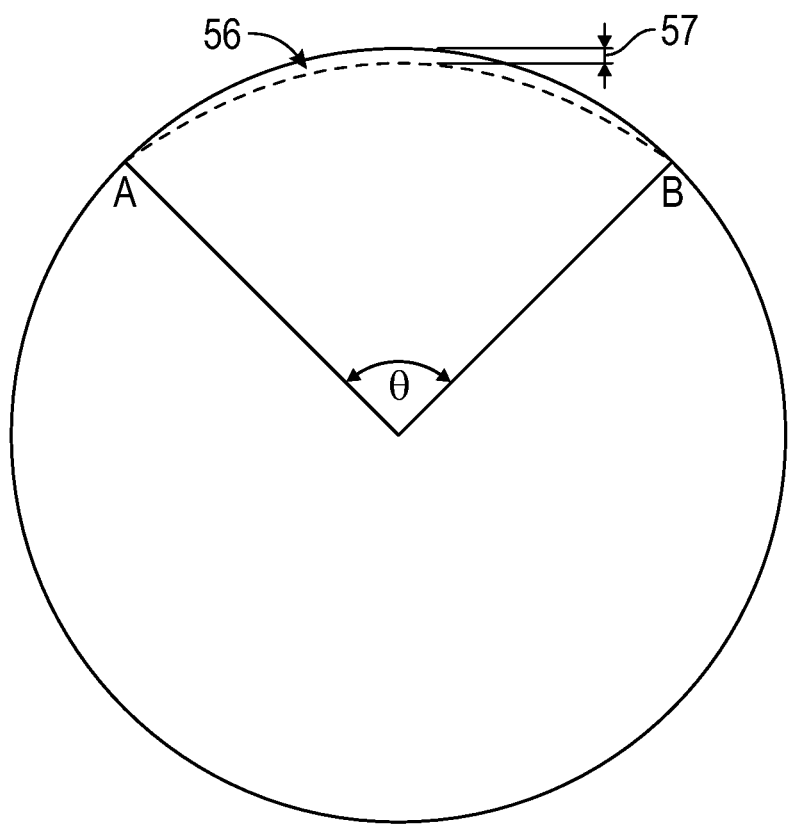
FIG. 9B is a side view of the corrective action of 9A.

FIGS. 9A-9B are schematic representations of techniques for controlling the out-of-plane gap 56 to align visual indicia 37 of the first edge region 24 with corresponding visual indicia 37 of the second edge region to maintain a target relationship between the first edge region 24 and the second edge region 26. FIG. 9A corresponds to a top view of the corrective action to align the first edge region 24 and the second edge region 26 relative to one another. FIG. 9B is a side view of the same corrective action shown in FIG. 9A. As shown in FIGS. 9A-9B, a detected deviation L exists between the visual indicia 37 at area A, which can correspond to portions of the first edge region 24 and the second edge region 26 monitored by the first sensor 41a and the second sensor 41b, as shown for example in FIGS. 5-6.

Through one or more corrective actions, such as the corrective actions described with respect to FIGS. 10-12 below, a control system (such as any of the control systems described herein) can move the first edge region 24 and the second edge region 26 relative to one another by, for example, controlling an edge pusher system (such as any of the edge pusher systems described herein) such that the respective visual indicia 37 of the first edge region 24 and the second edge region 26 move into alignment with one another when the adjacent sheets of material reach area B. In the description of each of the corrective actions that follows, the first edge region 24 is leading the second edge region 26 such that the corrective action is applied to the first edge region 24 to make the first edge region 24 move along a longer path than the adjacent edge while both edges moving along an ideal spiral joint between the two. This may be continued with the first edge region 24 following a longer path relative to the second edge region 26 until the respective visual indicia 37 within the first edge region 24 and the second edge region 26 are once again aligned. It should be appreciated that this convention is used for the sake of explanation and that the corrective actions described herein can include any combination of movement of the first edge region 24 and the second edge region 26 relative to one another. For example, the corrective actions can also or instead be applied to the second edge region 26 in instances in which the second edge region 26 leads the first edge region 24. As another example, the corrective actions can also or instead be applied to either the first edge region 24 or the second edge region 26, irrespective of which edge region is leading, given that applying a corrective action to make one edge region take a longer path can produce the same result as making the other edge region take a shorter path. Further, it should be appreciated that the corrective actions can be applied to the first edge region 24 and/or to the second edge region 26 of the same sheet 18, such as when the sheet 18 is spiral formed with a diameter small enough to wrap the sheet 18 onto itself.

Figure 10:
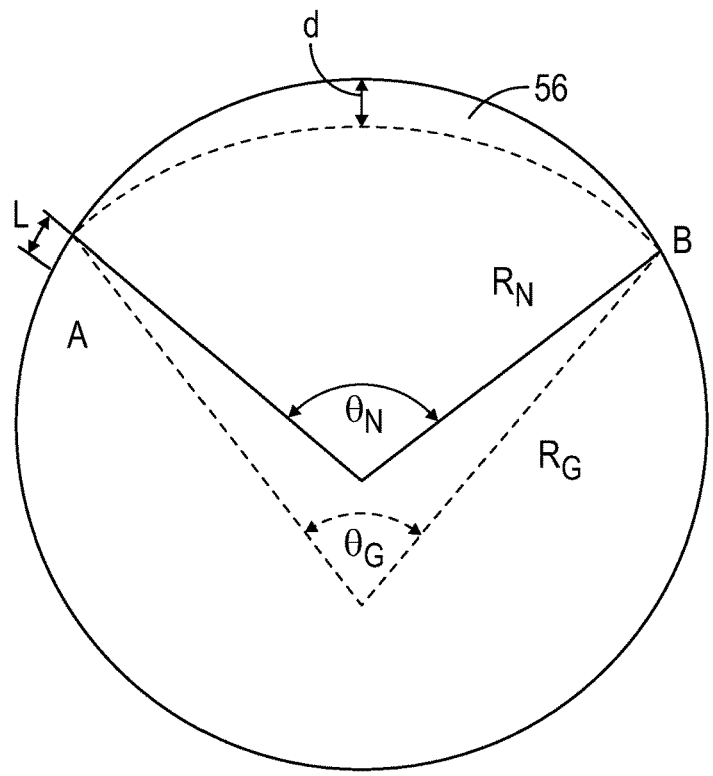
FIG. 10 is a schematic representation of a geometric relationship of a corrective action for aligning a first edge portion and a second edge portion of a conical segment through control of an out-of-plane gap.

Referring to FIG. 10, the respective visual indicia 37 of the first edge region 24 and the second edge region 26 can be brought into alignment with one another by, for example, changing the radius of curvature of the first edge region 24 relative to the radius of curvature of the second edge region 26 over a correction angle θ to control an out-of-plane gap 56, which effectively results in wrapping the sheet 18 corresponding to the first edge region 24 at a radius of curvature different than that of the sheet 18 corresponding to the second edge region 26. The result is that, over the correction angle θ, the length of one of the first edge region 24 and the second edge region 26 is shorter than the other one of the first edge region 24 and the second edge region 26. This difference in length can bring the respective visual indicia 37 of the first edge region 24 and the second edge region 26 into alignment with one another at area B. It will be understood that this technique is advantageously bi-directional. That is, the controlled edge—the edge with a varying radius of curvature—may be controlled to increase or decrease its length relative to the non-varying edge, thus facilitating re-alignment in either direction as necessary.

The magnitude of the detected deviation L is the amount of the alignment error to be corrected and may be expressed as follows for a corrective action in which a radius of curvature of the first edge region 24 is to be changed relative to the radius of curvature of the second edge region 26:

$$L = R_N\theta_N - R_G\theta_G \quad \text{Eq. 1}$$

where:
  $R_N$=radius of curvature of the second edge region 26, which is equal to the nominal tube radius;
  $\theta_N$=wrap angle over which to correct the detected deviation L;
  $R_G$=radius of curvature imparted on the first edge region 24; and
  $\theta_G$=equivalent wrap angle for the curve of the first edge region 24.

In general, $R_N$ is a known parameter dictated by the design of the structure being spiral formed, and $R_G$ and $\theta_N$ are determined based on a maximum permitted linear magnitude d of the out-of-plane gap 56, as illustrated by a maximum gap 57 in FIG. 9B. For example, the magnitude d of the out-of-plane gap 56 may be limited by a product specification (e.g., a variability specified by the end user) or the magnitude d may be established by physical limitations on a welding process or other technique used to join the edges. $R_G$ and $\theta_G$ are related to one another as follows:

$$\sin\left(\frac{\theta_G}{2}\right) = \frac{R_N}{R_G}\sin\left(\frac{\theta_N}{2}\right) \quad \text{Eq. 2}$$

The magnitude d of the out-of-plane gap is related to these parameters by:

$$d = R_N\left(1 - \cos\left(\frac{\theta_N}{2}\right)\right) + R_G\left(\cos\left(\frac{\theta_G}{2}\right) - 1\right) \quad \text{Eq. 3}$$

Based on this relationship, limits for $R_G$ and $\theta_G$ can be determined through Eq. 2 and Eq. 3 when the maximum permitted linear magnitude d of the out-of-plane gap 56 is specified.

Figure 11:
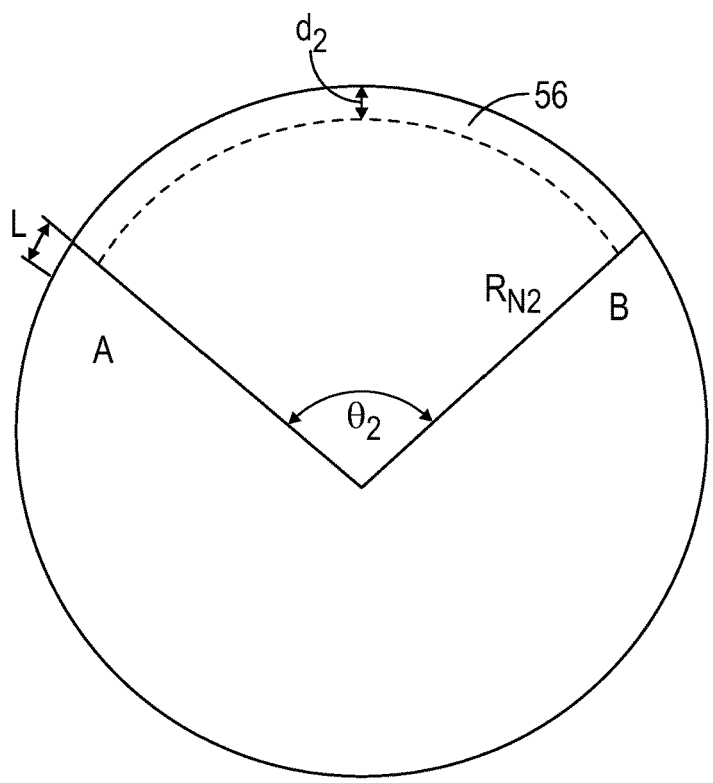
FIG. 11 is a schematic representation of a geometric relationship of a corrective action for aligning a first edge portion and a second edge portion of a conical segment through control of an out-of-plane gap.

Referring to FIG. 11, as an additional or alternative example, the respective visual indicia 37 of the first edge region 24 and the second edge region 26 can be brought into alignment with one another by applying a step change in radius to the first edge region 24 and then maintaining the respective radius of curvature for each edge. In this embodiment, a magnitude $d_2$ of the out-of-plane gap 56 is maintained until the misalignment of the respective visual indicia 37 of the first edge region 24 and the second edge region 26 is resolved to within an acceptable degree of alignment. For this type of corrective action, the magnitude of the detected deviation L that is being corrected may be expressed as follows:

$$L = R_{N2}\theta_2 - (2L_T + (R_{N2} - d_2)\theta_2) \quad \text{Eq. 4}$$

where:
  $L_T$=a transition length
  $R_{N2}$=radius of curvature of the second edge region 26, which is equal to the nominal tube radius; and
  $\theta_2$=wrap angle over which to correct the detected deviation L.

The transition length $L_T$ (not shown in FIG. 11) accounts for the finite length required to impart the desired out-of-plane gap 56 when the change is initiated, and to remove the out-of-plane gap 56 when the edges are re-aligned and the adjustment is to be terminated. The magnitude of $L_T$ is dependent on the shape of the transition region and depends, for example, on physical or practical limitations imposed by the material being used, the actuators, the control system and other hardware. In general, however, the longer the path over which the alignment is corrected the smaller the effect of the transition area. For a given value of the maximum permitted linear magnitude d of the out-of-plane gap 56, the wrap angle over which the error is resolved is expressed as follows:

$$\theta_2 = \frac{L + 2L_T}{d_2} \quad \text{Eq. 5}$$

Figure 12:
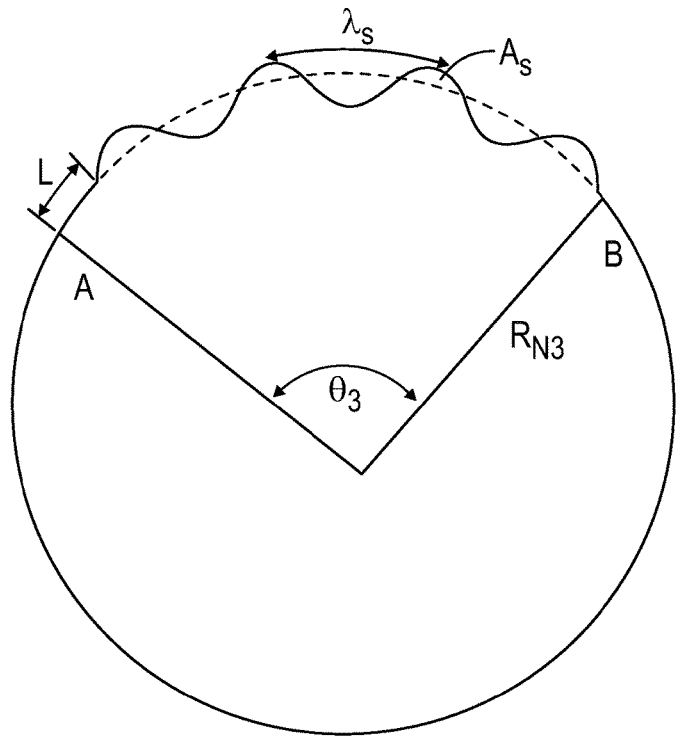
FIG. 12 is a schematic representation of a geometric relationship of a corrective action for aligning a first edge portion and a second edge portion of a conical segment through control of an out-of-plane gap.

Referring to FIG. 12, as an additional or alternative example, the respective visual indicia 37 of the first edge region 24 and the second edge region 26 can be brought into alignment with one another by imparting an oscillation to one of the first edge region 24 or the second edge region 26 while the other one of the first edge region 24 or the second edge region 26 is maintained at the nominal radius of the structure being spiral formed, e.g., along an idealized spiral joint for the structure. This oscillation imparts a longer relative path to one of the edge regions so that the other edge can catch up to a realigned state as both sheets traverse the idealized spiral joint.

At each point along the oscillating segment, when the oscillation is in the form of a sine wave, the position (radius) of the oscillating sheet, $R_s$, can be calculated by:

$$R_s = R_{N3} + A_s\sin\left(2\pi\frac{\theta}{\lambda_s}\right) \quad \text{Eq. 6}$$

where:
  $\theta$=angular distance along the path;
  $R_{N3}$=nominal radius of curvature of the second edge region, which is equal to the nominal tube radius
  $\lambda_s$=angular wavelength of sine wave
  $A_s$=amplitude of sine wave Then, the length of the oscillating segment, $L_s$, can be calculated by:

$$L_s = \int_{\theta_A}^{\theta_B} \sqrt{R_{N3}^2 + A_s^2 + 2R_{N3}A_s\sin(\omega\theta) + A_s^2\cos^2(\omega\theta)(\omega^2 - 1)} \quad \text{Eq. 7}$$

where:

$$\omega = \frac{2\pi}{\lambda_s} \quad \text{Eq. 8}$$

and $\theta_A$, $\theta_B$ are the wrap angles at which the oscillation begins and ends, respectively.

Then the alignment error that is corrected is:

$$L = R_{N3}\theta_3 - L_s \qquad \text{Eq. 9}$$

In general, a shorter wavelength and a larger amplitude allow the alignment error, L, to be corrected over a shorter distance. The wavelength and the amplitude may in general by limited by manufacturing capabilities, materials, product specifications, or any other relevant criteria.

Figure 13:
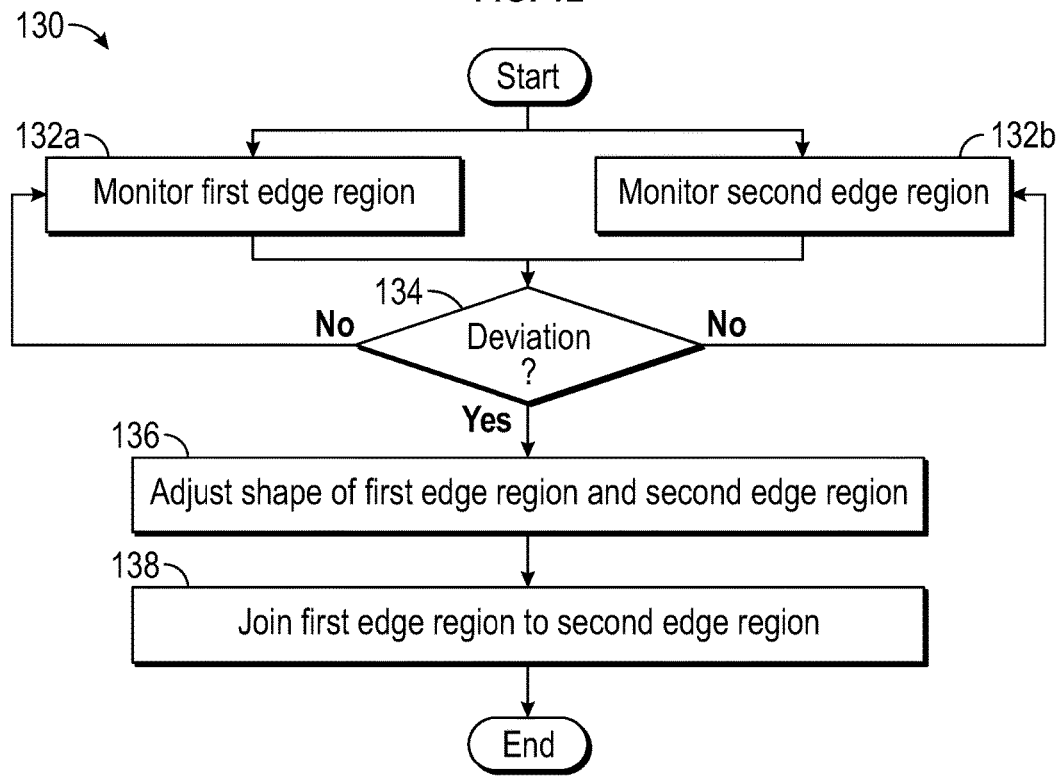
FIG. 13 is a flowchart of an exemplary method of spiral forming a structure.

Referring now to FIG. 13, a flowchart of an exemplary method 130 of spiral forming a structure is shown. It should be appreciated that the method 130 can be carried out, for example, by any of the fabrication systems described herein to form any of the structures described herein, including but not limited to a cylinder, a cone or a frusto-conical structure or segment. For example, one or more steps in the exemplary method 130 can be carried out by a processing unit of a control system (e.g., the processing unit 60 of the control system 44 in FIG. 5). Additionally, or alternatively, one or more steps in the exemplary method 130 can be carried out by an operator providing inputs (e.g., through a keyboard, a mouse, and/or a graphical user interface) to a control system such as the control system 44 of FIG. 5.

The exemplary method 130 includes monitoring 132a a first edge region of a rolled material, monitoring 132b a second edge region of the rolled material, detecting 134 a deviation from a target relationship between the first edge region and the second edge region, adjusting 136 a shape of the first edge region and a shape of the second edge region relative to one another to reduce the deviation, and joining 138 the first edge region to the second edge region. It should be appreciated that, if deviation is not detected 134, the first edge region and the second edge region can be jointed 138 together without adjusting 136 the shape of the first edge region and the shape of the second edge region relative to one another. The second edge region is adjacent to and joined to the first edge region along a spiral joint formed in the rolled material. The first edge region can be along a first rolled sheet, and the second edge region can be along a second rolled sheet which, in certain implementations, is joined to an end of the first rolled sheet.

The spiral can extend circumferentially about an axis of the rolled material, generally with a radius greater than a thickness of the rolled material. In some implementations, a radial distance from the axis to the spiral is substantially constant along the axial dimension of the rolled material such that the material is cylindrical. In some implementations, a radial distance from the axis to the spiral changes at a constant rate such that the rolled material is conical. Other useful structures may be formed with other monotonically decreasing changes in radius. It should be appreciated that strict geometric precision is not generally required, and the resulting shape of the spiral formed structure may be substantially cylindrical or conical, e.g., to within manufacturing tolerances or other specifications.

Monitoring 132a the first edge region of the rolled material and monitoring 132b the second edge region of the rolled material can include receiving signals from one or more sensors detecting respective visual indicia on the first edge region and the second edge region. The one or more sensors for monitoring 132a the first edge region and monitoring 132b the second edge region can be any of the types of sensors described herein. Additionally, alternatively, monitoring 132a the first edge region of the rolled material and monitoring 132b the second edge region of the rolled material can include receiving an input from an input device operated by an operator observing the first edge region and the second edge region.

Monitoring 132a the first edge region and monitoring 132b the second edge region can be done, for example, at a position upstream of joining 138 the first edge region to the second edge region of the spiral joint. In such implementations, a detected misalignment at a given position along the first edge region and the second edge region can be corrected before joining 138 the first edge region to the second edge region of the spiral joint.

Additionally, or alternatively, monitoring 132a the first edge region and monitoring 132b the second edge region can be done at a first position along the respective edge regions, and the shape of the first edge region and the shape of the second edge region can be adjusted 136 at a second position along the respective edge regions. In such implementations, the first position is spatially separated from the second edge position. For example, monitoring 132a the first edge region and monitoring 132b the second edge region can be done at a first position downstream of joining 138 the first edge region and the second edge region while the shape of the first edge region and the shape of the second edge region can be adjusted 136 at a second position upstream of joining 138 the first edge region and the second edge region. In such implementations, the adjustment 136 at the second position is based on the monitoring 132a, 132b at the first position.

In certain implementations, monitoring 132a the first edge region and/or monitoring 132b the second edge region includes monitoring discrete portions of each respective edge region. For example, each edge region can have visual indicia, such as tick marks, that are monitored for alignment with one another. Such monitoring of alignment of visual indicia along the first edge region and the second edge region can be performed semi-automatically, and may for example include receiving input from an operator regarding the level of alignment based upon visual inspection. Additionally, or alternatively, such monitoring of alignment of visual indicia along the first edge region and the second edge region can include automatically monitoring the alignment, such as by receiving, from an optical sensor directed at the rolled material, an optical signal indicative of the respective edge region or second edge region (e.g., indicative of the position of visual indicia along each edge region). As another additional or alternative example, the first edge region and the second edge region can include discrete portions with different optical, mechanical, or magnetic properties that differ from those of the bulk of the sheet material, and monitoring can include detecting corresponding changes as material passes by sensors during a fabrication process.

Monitoring 132a the first edge region and/or monitoring 132b the second edge region may also or instead include continuously monitoring each respective edge region, such as by monitoring a surface roller in contact with the rolled material, a rolled distance signal corresponding to the respective first edge region or second edge region.

More generally, it should be appreciated that any of the sensors described herein, alone or in combination with one another, can be used to monitor 132a the first edge and/or monitor 132b the second edge without departing from the scope of this disclosure. Similarly, monitoring may generally include marking the material at predetermined intervals with suitable visual or other indicia to facilitate monitoring. This may, for example, include etching, painting, inking, magnetizing, applying stickers, and so forth. The intervals may be fixed intervals, or the intervals may vary, e.g., according to the desired sensitivity of measurements.

Detecting 134 the deviation from the target relationship between the first edge region and the second edge region can include comparing the monitored first edge region to the monitored second edge region and/or to a standard. For example, detecting 134 the deviation from the target relationship can include detecting whether the first edge region matches the second edge region to within a predetermined tolerance (e.g., a specified manufacturing tolerance). In certain implementations, tracking indicia can be marked on the first edge region and/or the second edge region such that detecting 134 the deviation from the target relationship includes detecting whether a location of the indicia in first edge region matches a location of the indicia in the second edge region to within the desired tolerance.

Detecting 134 the deviation from the target relationship between the first edge region and the second edge region can be carried out by or with the assistance of a processing unit of a control system such as any of the control systems described herein. While this may include fully automated monitoring and correction, e.g., using the techniques discussed above, this may also include semi-automated techniques. For example, detecting 134 the deviation from the target relationship between the first edge region and the second edge region can include receiving a manual input from an operator indicating the presence and/or degree of the detected deviation. In one embodiment, the operator can visually compare a signal received from a monitored 132a first edge region and a monitored 132b second edge region and provide a manual input to the control system if the operator determines that the first edge region and the second edge region are misaligned. The manual input from the operator can, for example, initiate a step of adjusting 136 the shape of the first edge region and the second edge region relative to one another using any of the techniques described herein.

Adjusting 136 the shape of the first edge region and the second edge region may include carrying out one or more of the corrective actions described herein. For example, adjusting 136 the shape of the first edge region and the second edge region relative to one another may include controlling an out-of-plane gap between the first edge region and the second edge region if the first edge region and the second edge region do not match one another to within a predetermined tolerance. The out-of-plane gap can be controlled, for example, by wrapping the first edge region at a first diameter and wrapping the second edge region at a second diameter different from the first diameter. Additionally, or alternatively, controlling the out-of-plane gap between the first edge region and the second edge region can include maintaining a maximum out-of-plane gap until the deviation from the target relationship between the first edge region and the second edge region is no longer detected. For example, the corrective out-of-plane gap can be maintained for not more than a complete circumference of the rolled material such that misalignment is corrected quickly. As another non-exclusive example, the out-of-plane gap can be sized to match a predetermined portion of the first edge region to a predetermined portion of the second edge region such that misalignment is resolved at a predetermined position.

In some implementations, adjusting 136 the shape of the first edge region and the second edge region relative to one another includes matching discrete portions of the first edge region to respective portions of the second edge region. In general, where the first edge region and the second edge region each include respective visual indicia along discrete portions of the respective edge regions, adjusting 136 the shape of the first edge region and the second edge region relative to one another can include matching the discrete portions of the edge regions to one another. The discrete portions can be, for example, spaced at regular intervals along the first edge region and along the same or different regular intervals along the second edge region such that the first edge region and the second edge region are adjusted 136 relative to one another at least at the regular intervals marked by the respective visual indicia along the first edge region and along the second edge region, and in a manner that moves the visual indicia back into alignment as necessary.

Joining 138 the first edge region to the second edge region can include welding the first edge region to the second edge region using any suitable welding technique or other process suitable for structurally joining sheets of steel or other building material. In such implementations, a welding unit may remain stationary to direct welding energy to a fixed point while the first edge region and the second edge region rotate as part of the spiral forming process.

Figure 14:
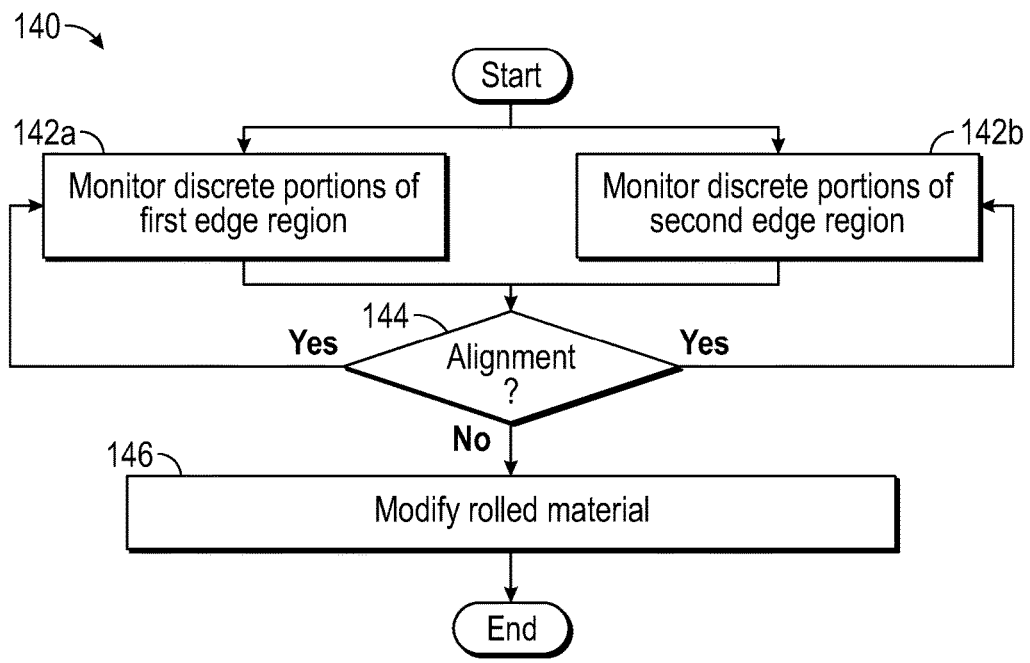
FIG. 14 is a flowchart of an exemplary method of spiral forming a structure.

Referring now to FIG. 14, a flowchart of another exemplary method 140 of spiral forming a structure is shown. The method 140 can be carried out, for example, by any of the fabrication systems described herein to form a structure such as a conical segment. For example, one or more steps in the exemplary method 140 can be carried out by a processing unit of a control system. Additionally, or alternatively, one or more steps in the exemplary method 140 can be carried out by an operator providing inputs (e.g., through a keyboard, a mouse, and/or a graphical user interface) to a control system.

The exemplary method 140 includes monitoring 142a discrete portions along a first edge region of a rolled material (e.g., a plurality of sheets joined end to end), monitoring 142b discrete portions along a second edge region of a rolled material, determining 144 whether one or more of the discrete portions along the first edge region is aligned, within a predetermined tolerance, with a corresponding one or more of the discrete portions along the second edge region along a spiral, and modifying 146 the rolled material to align the respective discrete portions along the first edge region and the second edge region. The second edge region is opposite the first edge region along a spiral joint, and modifying 146 the rolled material to align the respective discrete portions of the first edge region and the second edge region can include any one or more of the corrective actions described herein, or any other physical modification of the rolled material that can be usefully employed to correctively adjust the abutting edge regions to address any misalignment that is detected. Further, the discrete portions of the first edge region and the second edge region can be demarcated using any of the marking or other detection techniques described herein.

Figure 15:
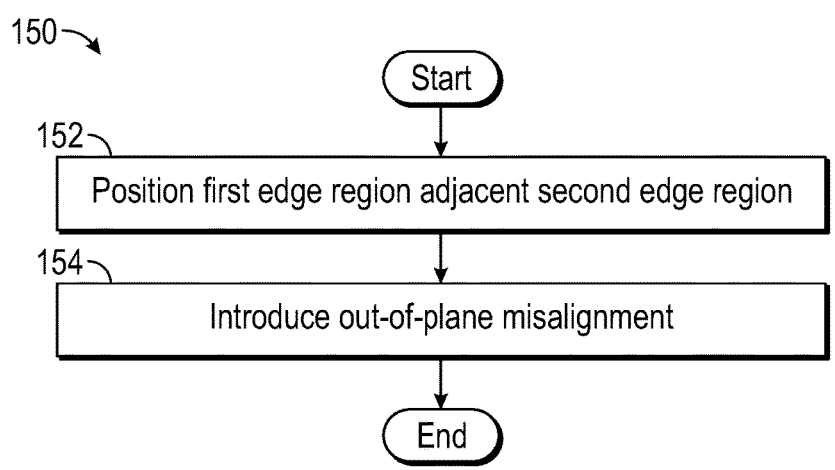
FIG. 15 is a flowchart of an exemplary method of spiral forming a structure.

Referring now to FIG. 15, a flowchart of yet another exemplary method 150 of spiral forming a structure is shown. The method 150 can be carried out by the any of the fabrication systems described herein to form a structure such as the conical segment. For example, one or more steps in the exemplary method 150 can be carried out by a processing unit of a control system. Additionally, or alternatively, one or more steps in the exemplary method 150 can be carried out by an operator providing inputs (e.g., through a keyboard, a mouse, and/or a graphical user interface) to a control system.

The exemplary method 150 includes positioning 152 a first edge region of a rolled material adjacent to a second edge region of the rolled material and introducing 154 an out-of-plane misalignment to the first edge region relative to an abutting edge of the second edge region. The second edge region is positioned 152 opposite the first edge region along a spiral according to any one or more of the methods described herein. In general, the spiral may follow a path of a spiral joint for an idealized fabrication process. The out-of-plane misalignment may be introduced 154 along the spiral to control an alignment, in the rolling direction, of the first edge region to the second edge region along the abutting edge such that the two edge regions are adjusted while substantially maintaining the intended path for the spiral joint. The control 154 of this out-of-plane misalignment can be carried out according to any one or more of the corrective actions described herein.

While certain embodiments have been described, other embodiments are additionally or alternatively possible.

For example, while joining a first edge region to a second edge region has been described as including welding, other methods of joining edge regions to one another are additionally or alternatively possible. Examples of such other methods include adhesive bonding, spot welding, seam locking, and/or mechanical fastening with bolts, rivets and the like, as well as combinations of the foregoing.

As another example, to the extent that one or more of the exemplary methods described herein have been described as being carried out by a control system, it should be appreciated that, in addition or in the alternative, one or more aspects of the exemplary methods described herein can be carried out by a human operator. For example, one or more corrective actions of the exemplary methods described herein can be carried out by an operator providing direct inputs (e.g., through a joystick) to one or more mechanical actuators such as those of the edge pusher system 40 of FIG. 5.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A spiral forming method comprising:
monitoring a first edge region of a rolled material in a rolling direction;
monitoring a second edge region of the rolled material in the rolling direction, the second edge region in an edge-to-edge abutting relationship with the first edge region along a spiral joint formed in the rolled material;
detecting a deviation from a target relationship in the edge-to-edge abutting relationship between the first edge region and the second edge region in the rolling direction;
adjusting a shape of the first edge region and a shape of the second edge region relative to one another to reduce the deviation from the target relationship of the first edge region and the second edge region in the rolling direction; and with the first edge region and the second edge region adjusted relative to one another, joining the first edge region to the second edge region along the spiral joint, wherein detecting the deviation includes detecting whether the first edge region matches the second edge region to within a predetermined tolerance in the rolling direction, and adjusting the shape of the first edge region and the second edge region relative to one another includes introducing an out-of-plane gap between the first edge region and the second edge region if the first edge region and the second edge region in the edge-to-edge abutting relationship do not match one another to within the predetermined tolerance in the rolling direction.

2. The method of claim 1, wherein monitoring the first edge region and monitoring the second edge region each includes monitoring the respective edge region at a position upstream of joining the first edge region to the second edge region along the spiral joint.

3. The method of claim 1, wherein monitoring the first edge region and monitoring the second edge region each includes monitoring the respective edge region at a first position along the respective edge region and adjusting the respective edge region at a second position along the respective edge region to reduce the deviation, the first position spatially separated from the second position.

4. The method of claim 3, wherein the first position for monitoring the first edge region and monitoring the second edge region each is downstream of joining the first edge region to the second edge region along the spiral joint.

5. The method of claim 1, wherein introducing the out-of-plane gap between the first edge region and the second edge region includes wrapping the first edge region at a first diameter and wrapping the second edge region at a second diameter different from the first diameter.

6. The method of claim 1, wherein introducing the out-of-plane gap between the first edge region and the second edge region includes maintaining a maximum out-of-plane gap until the deviation from the target relationship between the first edge region and the second edge region is no longer detected.

7. The method of claim 1, wherein introducing the out-of-plane gap between the first edge region and the second edge region includes maintaining the out-of-plane gap for not more than a complete circumference of the rolled material.

8. The method of claim 1, wherein introducing the out-of-plane gap between the first edge region and the second edge region includes sizing the out-of-plane gap to match a predetermined portion of the first edge region to a predetermined portion of the second edge region.

9. The method of claim 1, wherein adjusting the first edge region and the second edge region relative to one another includes matching discrete portions of the first edge region to respective discrete portions of the second edge region.

10. The method of claim 9, wherein the respective discrete portions of the first edge region and the second edge region are spaced at regular, discrete intervals along the first edge region and the second edge region.

11. The method of claim 10, wherein the spacing of the regular, discrete intervals along the first edge region is the same as the spacing of the regular, discrete intervals along the second edge region.

12. The method of claim 9, wherein matching the discrete portions of the first edge region to the respective discrete portions of the second edge region includes matching visual indicia on the first edge region to respective visual indicia of the second edge region.

13. The method of claim 1, wherein detecting the deviation from the target relationship between the first edge region and the second edge region includes receiving a manual input corresponding to the detected deviation.

14. The method of claim 1, wherein at least one of monitoring the first edge region and monitoring the second edge region includes receiving, from a surface roller in contact with the rolled material, a rolled distance signal corresponding to the respective first edge region or second edge region.

15. The method of claim 1, wherein at least one of monitoring the first edge region and monitoring the second edge region includes receiving, from a magnetic sensor in proximity with the rolled material, a magnetic signal corresponding to the respective first edge region or second edge region.

16. The method of claim 1, wherein at least one of monitoring the first edge region and monitoring the second edge region includes receiving, from an optical sensor directed at the rolled material, an optical signal indicative of the respective first edge region or second edge region.

17. A method comprising:
monitoring discrete portions along a first edge region of a rolled material in a rolling direction;
monitoring discrete portions along a second edge region of the rolled material in the rolling direction, the second edge region in an edge-to-edge abutting relationship with the first edge region along a spiral;
determining whether one or more of the discrete portions along the first edge region is aligned, within a predetermined tolerance in a rolling direction, with a corresponding one or more of the discrete portions along the second edge region in the edge-to-edge abutting relationship with the first edge region along the spiral; and
modifying the rolled material to align the respective discrete portions along the first edge region and the second edge region, wherein modifying the rolled material includes introducing an out-of-plane gap between the first edge region and the second edge region if the one or more of the discrete portions along the first edge region and the corresponding one or more of the discrete portions along the second edge region in the edge-to-edge abutting relationship with the first edge region do not match one another to within the predetermined tolerance in the rolling direction.

18. A method comprising:
positioning a first edge region of a rolled material adjacent to a second edge region of the rolled material such that the second edge region is in an edge-to-edge abutting relationship with the first edge region along a spiral; and
introducing an out-of-plane misalignment to the first edge region relative to an abutting edge of the second edge region in the edge-to-edge abutting relationship with the first edge region along the spiral, the out-of-plane misalignment controlling alignment, in a rolling direction, of the first edge region to the second edge region along the abutting edge.

* * * * *